(12) United States Patent
Bhattacharjya

(10) Patent No.: US 7,355,757 B2
(45) Date of Patent: Apr. 8, 2008

(54) FAST EDGE RECONSTRUCTION WITH UPSCALING FOR PULSE WIDTH MODULATION RENDERING

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 1009 days.

(21) Appl. No.: 10/262,733

(22) Filed: Oct. 1, 2002

(65) Prior Publication Data

US 2004/0061877 A1 Apr. 1, 2004

(51) Int. Cl.
*G06K 15/00* (2006.01)

(52) U.S. Cl. .............. 358/3.27; 358/3.26; 345/611; 382/266; 382/260; 382/261; 382/262; 382/263; 382/264; 382/265

(58) Field of Classification Search ........... 358/3.27, 358/3.26; 345/611; 382/260, 266, 261, 382/262, 263, 264, 265
See application file for complete search history.

(56) References Cited

U.S. PATENT DOCUMENTS

| | | | |
|---|---|---|---|
| 5,325,474 A * | 6/1994 | Kumazaki et al. | 345/611 |
| 5,386,509 A * | 1/1995 | Suzuki et al. | 345/501 |
| 5,400,154 A | 3/1995 | Takayama et al. | |
| 5,432,611 A | 7/1995 | Haneda et al. | |
| 5,596,684 A * | 1/1997 | Ogletree et al. | 358/1.9 |
| 5,596,964 A * | 1/1997 | Kurihara | 123/306 |
| 5,774,601 A | 6/1998 | Mahmoodi | |
| 5,917,963 A | 6/1999 | Miyake | |
| 6,233,060 B1 * | 5/2001 | Shu et al. | 358/1.9 |
| 6,757,449 B1 * | 6/2004 | Loce | 382/299 |
| 6,834,124 B1 * | 12/2004 | Lin et al. | 382/261 |
| 7,106,476 B1 * | 9/2006 | Tonami et al. | 358/1.9 |
| 2002/0101435 A1 * | 8/2002 | Sasaki et al. | 345/611 |
| 2002/0126313 A1 * | 9/2002 | Namizuka | 358/2.1 |
| 2003/0210409 A1 * | 11/2003 | Huang et al. | 358/1.1 |

* cited by examiner

*Primary Examiner*—Twyler Lamb
*Assistant Examiner*—Jacky X. Zheng

(57) ABSTRACT

A selected antialiasing technique is applied to non-labeled gray-scale or color image data by deconstructing an image into a set of binary images, applying the antialiasing method to each binary image to generate antialiased images, and combining the antialiased images to generate an output image. Computational requirements may be reduced by identifying boundaries within the input image data and generating and antialiasing localized binary images only in selected regions of the image. Antialiased image data is rendered using subpixels generated by pulse width modulation ("PWM") while preserving boundary information present in the original rasterized image, by identifying one or more donor pixels in the rasterized image that influence the gray level of a target pixel in the antialiased image data, computing for each donor pixel an occupancy rate indicating a degree to which the donor pixel influences the gray level of the target pixel, and determining an optimal location of a subpixel within the target pixel based on the occupancy rates.

11 Claims, 13 Drawing Sheets

714

| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

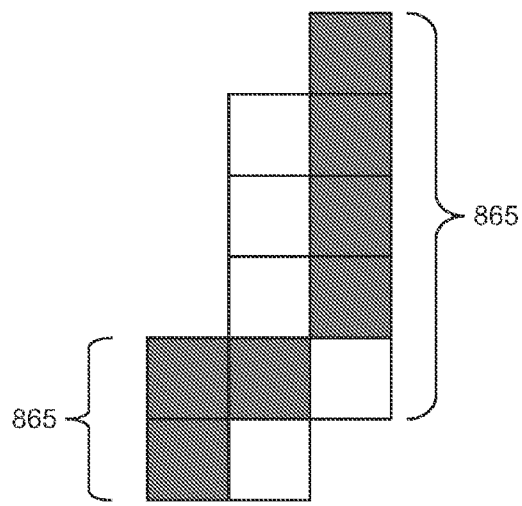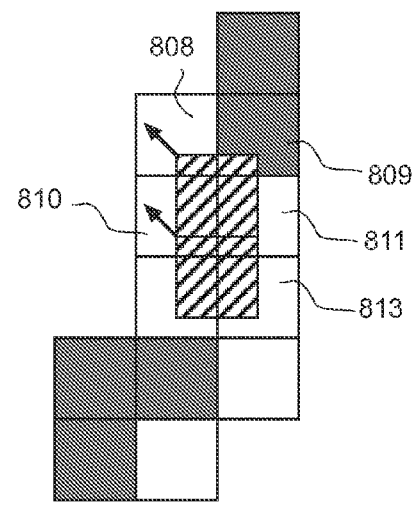
Fig. 7(a)　　　　　　Fig. 7(b)
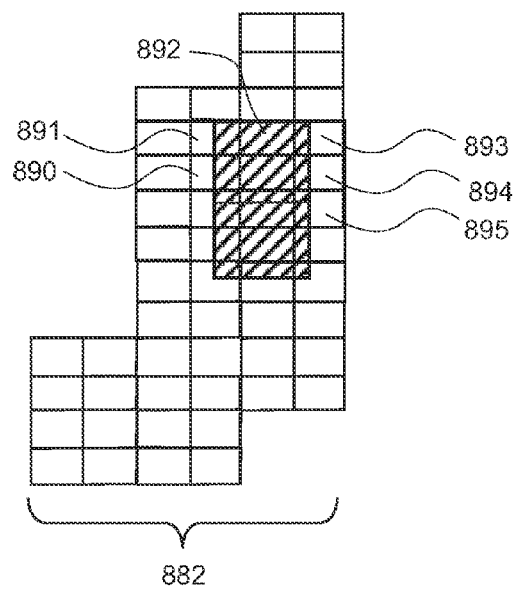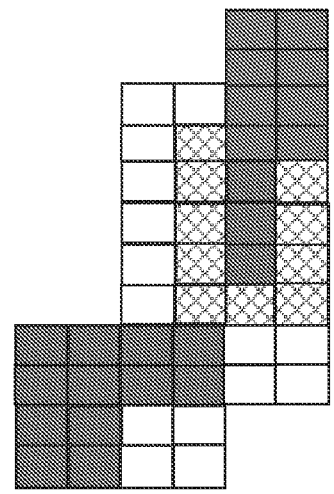
Fig. 7(c)　　　　　　Fig. 7(d)

FAST EDGE RECONSTRUCTION WITH UPSCALING FOR PULSE WIDTH MODULATION RENDERING

TECHNICAL FIELD

The invention relates to the processing of image data for the purpose of enhancing the appearance of an image as presented by a device such as a printer, copier or display.

BACKGROUND ART

Antialiasing is a technique used to reduce or eliminate the appearance of undesired artifacts in an image. Typically, antialiasing techniques are applied to rasterized image data to reduce the visibility of jagged edges along boundaries and to soften abrupt transitions between different gray levels.

Applying an antialiasing process to an image that contains multiple regions representing different modes (such as text, graphics or photographic images) presents special difficulties. It is often preferable to apply different antialiasing algorithms to different groups of pixels depending on their role within the image. For example, it is often desirable to preserve and even enhance the distinct edges of text characters. It may also be desirable to maintain a clear boundary around a graphical image that is superimposed on a photographic image. In contrast, it may be preferable to apply a smoothing algorithm to an edge or boundary within a region. Performing an antialiasing operation without distinguishing between the different modes within an image may result in a reduction in image quality.

A common technique employed to distinguish between regions assigns a "label" to a pixel in an image indicating whether the pixel is used to render text, graphics, photographs, or another mode. Many known antialiasing techniques are designed to interpret these labels and selectively to apply a different antialiasing algorithm to each type of pixel, or leave some pixels unaltered. Such techniques tend to be efficient and produce high-quality output images.

One such technique is described in U.S. patent application Ser. No. 10/047,326, filed Jan. 14, 2002, which is incorporated herein by reference in its entirety. This technique enhances the appearance of edges in text and graphics regions by identifying a "boundary pixel" located on a boundary of a text or graphics object, tracing a group of boundary pixels to construct a local boundary segment, parameterizing and smoothing the local boundary segment to generate a new local boundary segment, and using the new local boundary segment to render the object. In one implementation of this technique, instructions for parameterizing and smoothing various boundary segments are pre-computed, stored in a look-up table, and directly accessed during the parameterizing and smoothing of local boundary segments.

Because techniques such as the one described above are designed to be used with labeled data, they cannot be used effectively with non-labeled data such as image data processed by a copier device or non-labeled data presented to a printing device. If an antialiasing technique designed for labeled image data is applied to non-labeled image data, the antialiasing processor will fail to distinguish between text and graphics pixels and smooth all boundaries in an image although it may be desirable to preserve the sharpness of some boundary pixels. There is a need to develop a technique allowing for antialiasing of non-labeled image data while preserving some of the boundary information present in the image data.

An additional challenge that arises in antialiasing relates to the rendition of pixels by pulse width modulation techniques. To apply pulse-width modulation, an output device divides the area represented by a pixel, referred to as the pixel cell, into a number of sub-elements and renders only a specified number of these sub-elements. For example, in the case of a printing device, toner particles may be deposited within several sub-elements on the left side of a pixel cell. A portion of a pixel cell rendered in this manner is referred to as a subpixel. A subpixel may cover an entire pixel cell.

When an antialiasing algorithm designed to smooth boundaries is applied to pixels that are on or near a boundary in an image, the antialiasing process typically "smears" across a region of pixels the gray level values that were originally concentrated along the boundary. If the antialiased pixels are rendered using conventional pulse width modulation techniques that do not account for the original boundary location, the subpixels may be placed in a dispersed pattern that causes the boundary information to be lost. There is a need to develop a method of determining an optimal location for a subpixel such that the boundary information present in the image data is preserved.

DISCLOSURE OF INVENTION

It is an object of the present invention to allow the application of a selected antialiasing technique to non-labeled gray-scale or color image data while preserving some boundary information. A binary set generator deconstructs the image data into a set of binary images or "binary sets." A boundary processor applies a selected antialiasing method to each binary set to generate antialiased images or "antialiased sets". An output image generator combines the antialiased sets to generate an output image. Computational requirements may be reduced by identifying boundaries within the input image data and generating localized binary sets only in selected regions of the image.

It is a further object of the present invention to render antialiased image data using subpixels generated by pulse width modulation ("PWM") while preserving boundary information present in the original rasterized image. A PWM processor identifies one or more "donor" pixels in the rasterized image that influence the gray level of a target pixel in the antialiased image data, computes for each donor pixel an occupancy rate indicating a degree to which the donor pixel influences the gray level of the target pixel, and determines an optimal location of a subpixel within the target pixel based on the occupancy rates.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 5(a) illustrates schematically a binary set generated from the input image shown in FIG. 4(a), in the form of an 8×8 array of values.

FIG. 5(b) shows the binary set of FIG. 5(a) in the form of a binary image.

FIG. 7(a) shows a group of pixels within a binary set making up a local boundary segment.

FIG. 7(b) illustrates schematically the boundary segment of FIG. 7(a) after parameterizing and smoothing.

FIG. 7(c) illustrates schematically several antialiased pixels mapped to pixels in an antialiased sets.

FIG. 7(d) shows the final gray level values in an antialiased set after values are mapped from the corresponding binary set.

MODES FOR CARRYING OUT THE INVENTION

Figure 1:
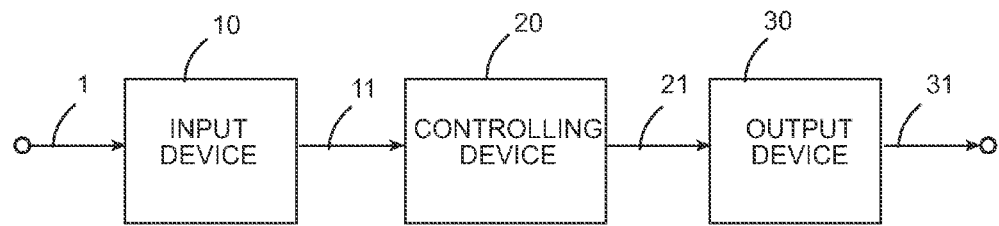
FIG. 1 illustrates major components in a typical image reproduction system.

FIG. 1 illustrates major components in a typical image reproduction system. Input device 10 receives from path 1 signals representing an original image and generates along path 11 a rasterized representation of the original image. Controlling device 20 receives this representation from path 11 and, in response, generates along path 21 an output-device-dependent representation of the original image. Output device 30 receives this representation from path 21 and, in response, generates along path 31 an output image. The present invention is directed toward improving the perceived quality of the visual representation produced by the output device 30.

Input device 10 may be a software application capable of generating text or graphics images. Alternatively, input device 10 may be an apparatus such as a scanner, camera or copier machine. If input device 10 is a software application for creating images, the signals received from path 1 could represent commands or data for the application.

Output device 30 may be any type of apparatus for creating a visual display or for printing that is capable of generating a rasterized output image from digital image data. If output device 30 is a printer, for example, the printed image generated along path 31 could be the printed image on paper. Although the following discussion contemplates implementation of the output device using a printing device such as a laser printer, the output device may be implemented as well using a copier machine or a computer display.

Figure 2:
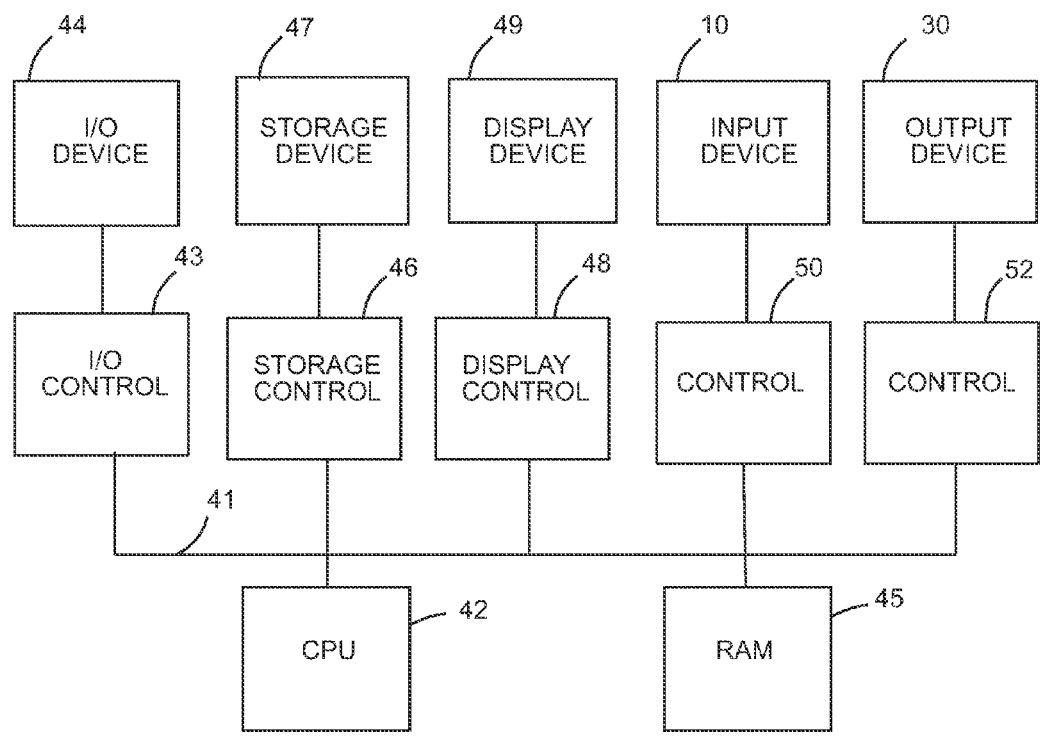
FIG. 2 illustrates major components in a typical personal computer system.

Controlling device 20 is responsible for transforming the rasterized representation of the original image received from path 11 into an output-device-dependent representation of the original image. Controlling device 20 may be implemented by software and/or hardware in a general-purpose computer such as that illustrated in FIG. 2. FIG. 2 illustrates major components in a typical personal computer system that may be used to carry out various aspects of the invention. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include programs that implement various aspects of the present invention. Display control 48 provides an interface to display device 49. Display device may be any type of visual display device. Control 50 represents an interface to input device 10. Control 52 represents an interface to output device 30 such as a laser printer.

In FIG. 2, all major system components connect to bus 41, which may represent more than one physical bus. A bus architecture is not required to practice the present invention.

The functions of one or more components as well as various aspects of the present invention can be implemented in a wide variety of circuitry including discrete logic components, one or more ASICs and/or program-controlled processors. For example, controlling device 20 may be implemented by a special-purpose device. The manner in which controlling device 20 is implemented is not important to the present invention. Other implementations including digital and analog processing circuitry may be used.

Antialiasing Image Data Containing Multiple Regions

Figure 3:
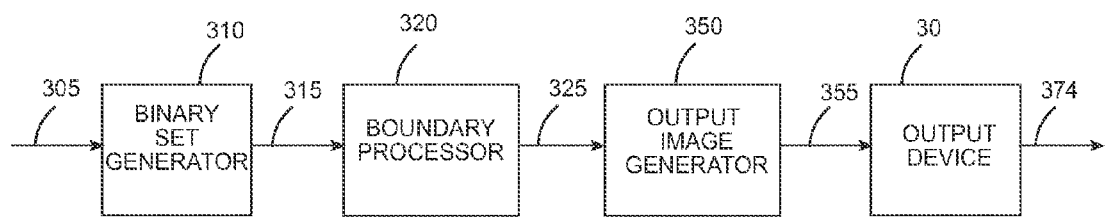
FIG. 3 is a block diagram of components that may be used to carry out various aspects of the invention.

FIG. 3 is a block diagram of components that may be used to carry out various aspects of the invention. A binary set generator 310 receives input image data in the form of a rasterized image from path 305. The binary set generator 310 transmits data along path 315 to a boundary processor 320. The boundary processor 320 transmits data along path 325 to an output image generator 350. The output image generator 350 transmits image data along path 355 to output device 30. The output device 30 generates an output image along path 374. In a preferred implementation, the binary set generator 310, the boundary processor 320 and the output image generator 350 are implemented by one or more software applications.

In one implementation, the binary set generator 310, the boundary processor 320, and the output image generator 350 are implemented within controlling device 20. In another implementation, the binary set generator 310, the boundary processor 320, and the output image generator 350 are incorporated within output device 30.

Binary Set Generator

Figure 4A:
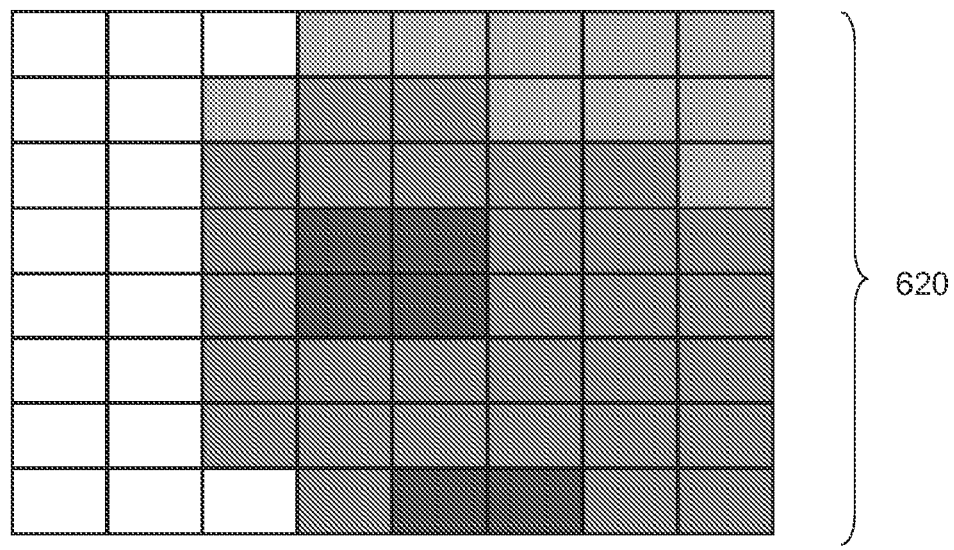
FIG. 4(a) shows an input image made up of an 8×8 array of pixels.
Figure 4B:
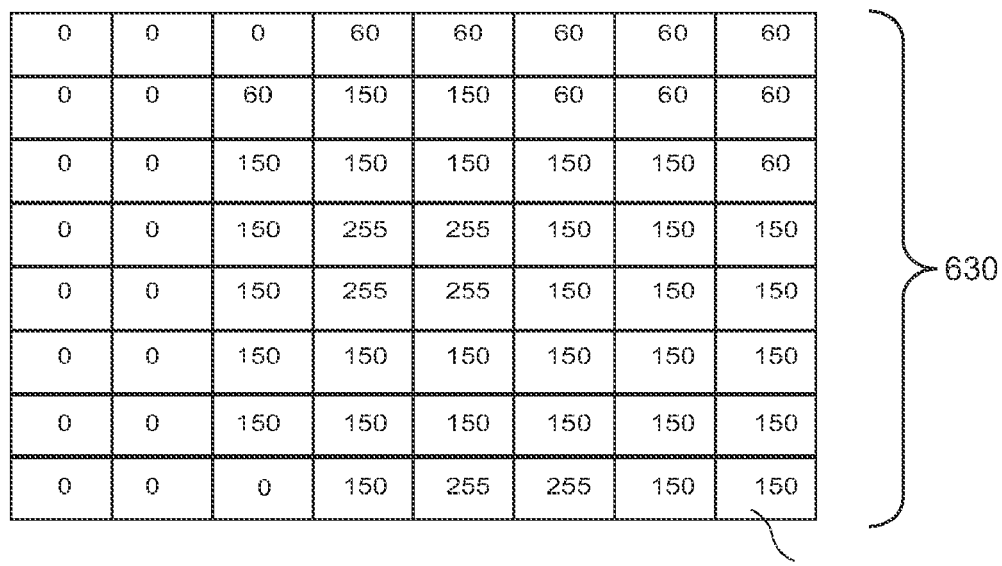
FIG. 4(b) shows schematically an 8×8 array of numbers representing sixty-four gray level values of the pixels in the input image of FIG. 4(a).

The binary set generator 310 receives input image data in the form of a rasterized image consisting of an M×N array of pixels each having one of Q gray level values from 0 to Q−1. For example, if M=300, N=400 and Q=256 then the input image has 120,000 pixels in a 300×400 array of pixels, and each pixel's gray level value may be any integer value from 0 to 255. The symbol G(i,j) will be used herein to represent a gray level value in the input image with coordinates (i,j). FIG. 4(a) shows an input image 620 made up of an 8×8 array of pixels and having parameter Q=256. FIG. 4(b) shows schematically an 8×8 array 630 of numbers representing sixty-four gray level values of the pixels within the input image 620 of FIG. 4(a). The lower-right pixel 634 has a gray level value equal to 150.

The binary set generator 310 generates an M×N array of binary values for each gray level from 0 to Q−1, producing Q arrays. Each of these arrays is referred to herein as a "binary set," and an array corresponding to gray level k is referred to specifically as "binary set k". Because the dimensions of a binary set are equal to those of the input image, there is a one-to-one correspondence between values in a binary set and gray level values in the input image. Specifically, a value in each binary set having coordinates (i,j), referred to herein as $g_k(i,j)$, corresponds to the gray level value G(i,j) in the input image. Because of this correspondence, a gray level value G(i,j) in the input image is referred to herein as the "parent" of the value $g_k(i,j)$ in each binary set.

Values within the binary sets are determined based on the gray level values in the input image. Each value $g_k(i,j)$ in binary set k is a binary value indicating whether or not the value k is greater than the parent gray level value G(i,j).

In a preferred implementation, the binary set generator 310 examines each binary set beginning with binary set 0 and assigns a value to each element therein. The binary set generator 310 selects an element with coordinates (i,j) in binary set k and examines the parent gray level value G(i,j) in the input image. If k≦G(i,j), then the element g(i,j) in binary set k is assigned the value zero. If k>G(i,j), then the element is given the value one. The determination is repeated for each element in each binary set, producing Q binary images.

Figure 5C:
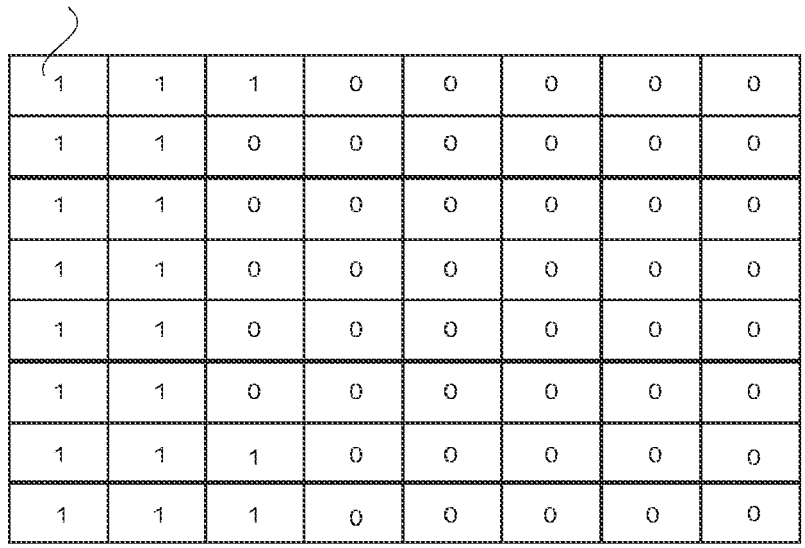
FIG. 5(c) illustrates schematically a binary set generated from the input image shown in FIG. 4(a), in the form of an 8×8 array of values.

The process of generating binary sets may be better understood by referring to FIGS. 5(a)-(f). FIG. 5(a) shows schematically binary set 0 generated from the input image 620 shown in FIG. 4(a), in the form of an 8×8 array 710 of binary values. Values in binary set 0 are determined by comparing gray level values in the input image 620 to the value 0. Referring to the upper-left pixel 714 of the array 710, the condition 0≦G(i,j) is satisfied and the element 714 is assigned a value of zero. Because the condition 0≦G(i,j) is satisfied for all elements in the array, all values in the array are equal to zero. FIG. 5(b) shows a binary image 720 that is generated from the values in binary set 0 shown in FIG. 5(a). Because all elements have a value equal to zero, all pixels in the binary image 720 are white.

Figure 5D:
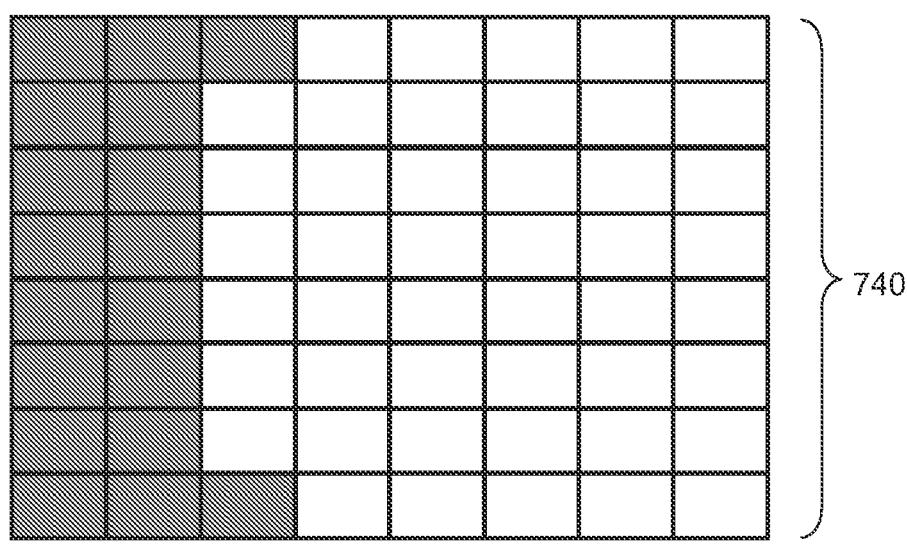
FIG. 5(d) shows the binary set of FIG. 5(c) in the form of a binary image.
Figure 5E:
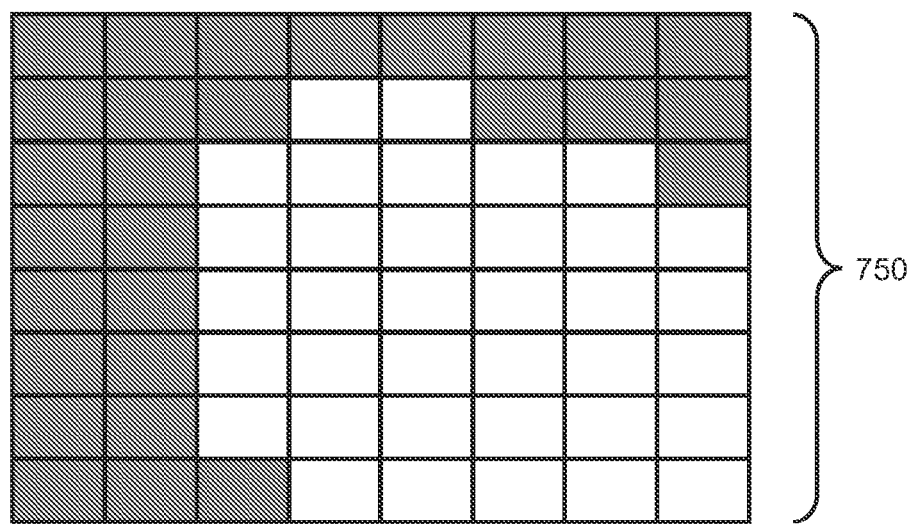
FIG. 5(e) shows a binary set generated from the input image shown in FIG. 4(a), in the form of a binary image.
Figure 5F:
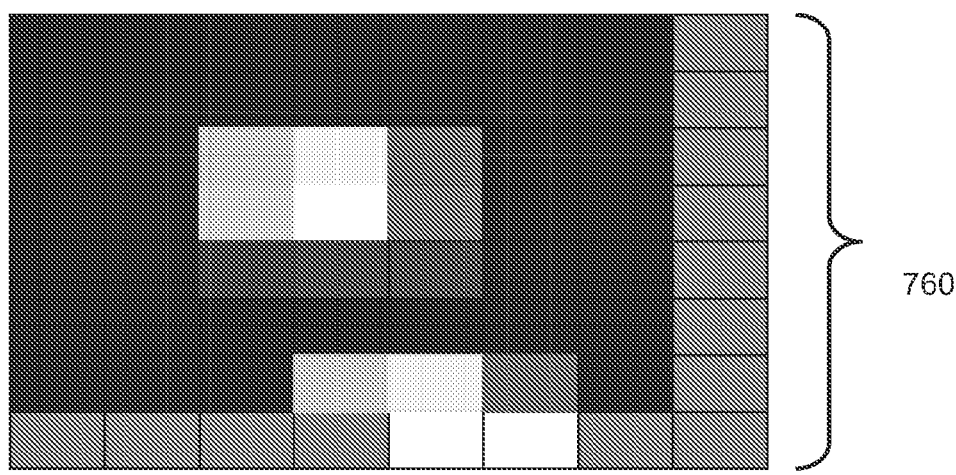
FIG. 5(f) shows a binary set generated from the input image shown in FIG. 4(a), in the form of a binary image.

FIGS. 5(c) and 5(d) show the values in binary set 50 and the corresponding binary image 740, respectively. Values in binary set 50, for example, are determined by comparing gray level values in the input image 620 to the value 50. Referring to the upper-left element 734 of FIG. 5(c), the condition 50>G(i,j) is satisfied and the element 734 has a value equal to one. Referring to FIG. 5(d), pixels with values equal to one are black and pixels with gray level values equal to zero are white. FIGS. 5(e) and 5(f) show binary images 750, 760 corresponding to binary set 100 and binary set 200, respectively.

Binary sets may be considered part of a topographical view of the gray level values in the input image. Each binary set represents a cross-section of the input image at gray level k. All elements of a binary set with a parent gray level value greater than or equal to k have a value equal to zero. All elements with a parent gray level value less than k have a value equal to one.

In an alternative implementation, values are assigned to elements in the binary sets vertically for each coordinate (i,j) by varying k from 0 to Q−1. The binary set generator 310 selects a gray level value G(i,j) in the input image and assigns a value of zero to the corresponding element in each binary set from binary set 0 up to and including the binary set corresponding to the gray level value G(i,j). The corresponding element in each binary set from the binary set corresponding to the gray level value G(i,j)+1 up to the binary set corresponding to the gray level value N−1 is assigned a value of one. This process is repeated for each pixel in the input image until a value is assigned to every element in every binary set.

Boundary Processor

A boundary processor 320 generates an antialiased set of pixels for each gray level from 0 to Q−1. The first step in the process of generating antialiased sets is similar to that of generating binary sets. The boundary processor 320 generates an array of pixels that may have dimensions M×N or may have different dimensions. An array of pixels generated by the boundary processor 320 is referred to as an "antialiased set," and the antialiased set corresponding to gray level k will be referred to specifically as "antialiased set k". Because the antialiased sets and the binary sets may have different dimensions, the correspondence between elements in binary set k and pixels in antialiased set k is not necessarily one-to-one. In the preferred implementation, an antialiased set comprises rM×sN pixels, where r and s are positive integers; therefore, an element in a binary set may correspond to more than, or exactly one, pixel in the corresponding antialiased set. By selecting appropriate parameters, it is possible to create an antialiased set with a higher resolution than the corresponding binary set. An antialiased set constructed with parameters r=3 and s=2, for example, comprises 3×2=6 times as many pixels as there are elements in the corresponding binary set, and each element in the binary set corresponds to exactly six pixels in the antialiased set. Alternatively, an antialiased set may be constructed to provide lower resolution than the corresponding binary set by selecting non-integer values for r and/or s that are less than one.

Figure 6A:
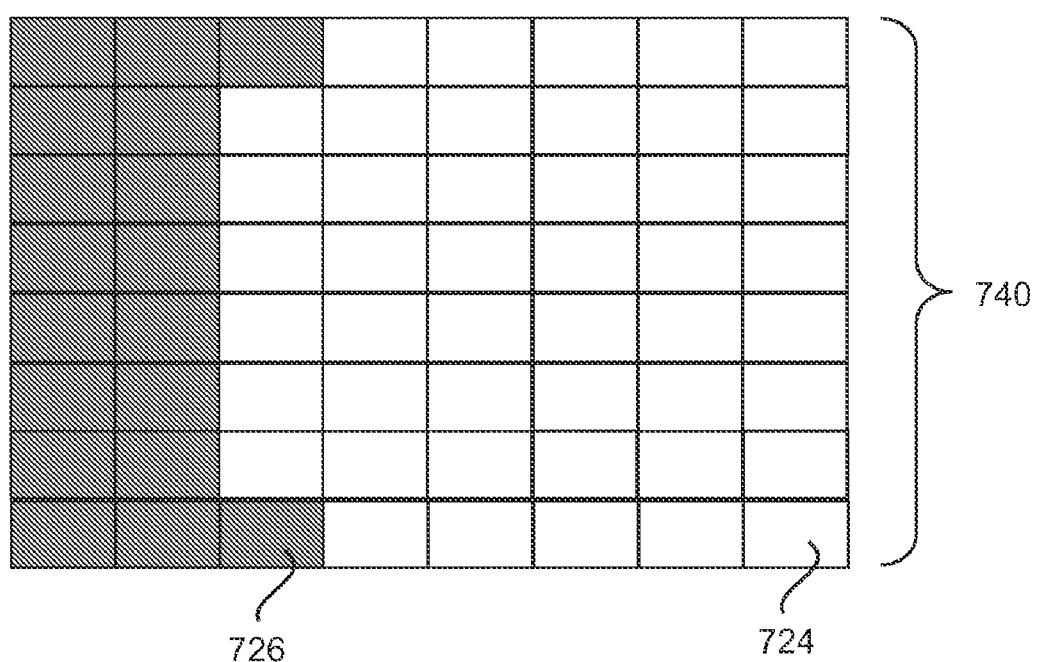
FIG. 6(a) shows a binary set in the form of a binary image.
Figure 6B:
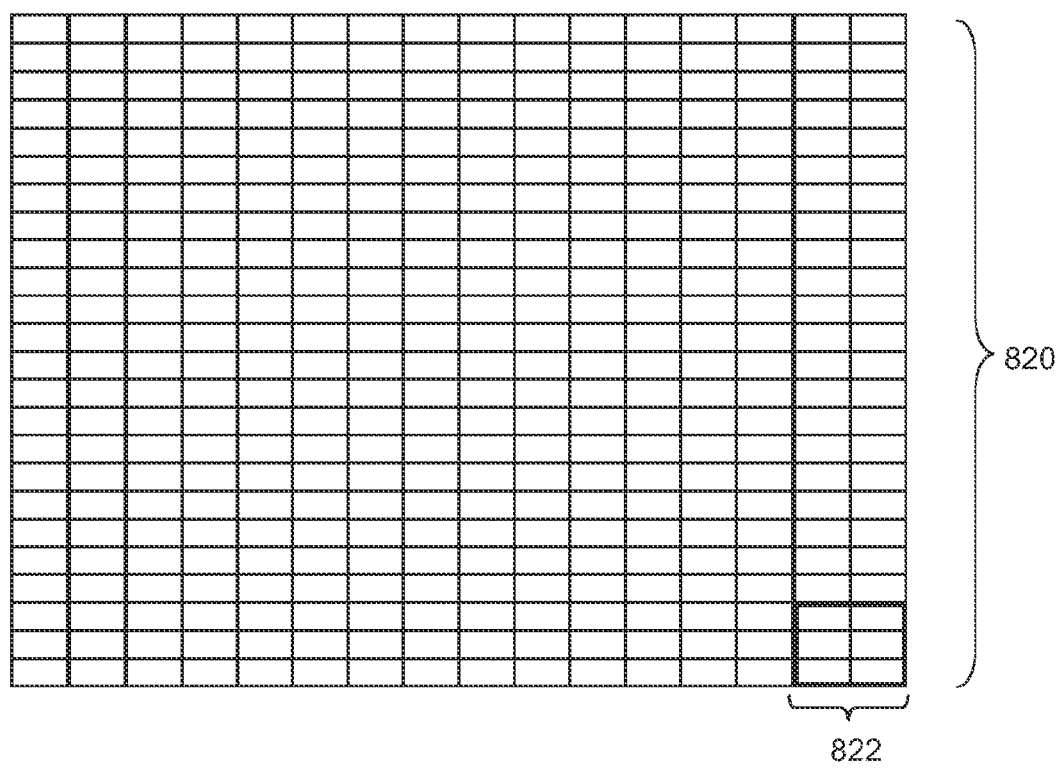
FIG. 6(b) illustrates schematically an 8×8 array of pixels that may be used to construct an antialiased set corresponding to the binary set of FIG. 6(a).
Figure 6C:
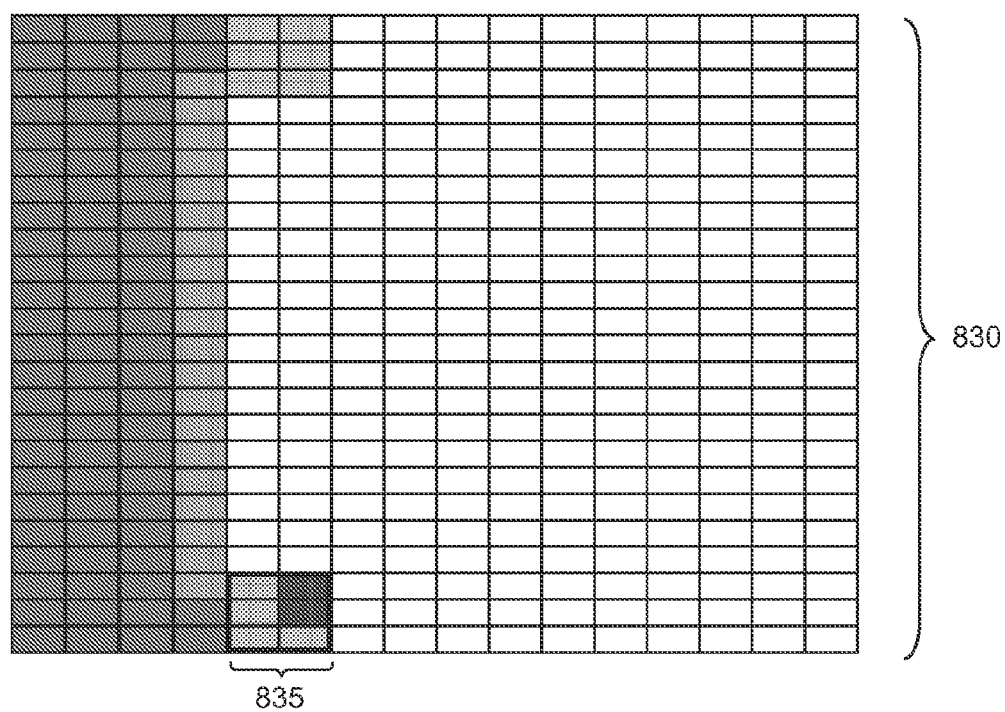
FIG. 6(c) shows an antialiased set corresponding to the binary image of FIG. 6(a).

The process of generating an antialiased set may be better understood by referring to FIGS. 6(a)-6(c). FIG. 6(a) shows an 8×8 binary set 740. Elements that appear black, including element 726, have a value of one. Elements that appear white have a value of zero. FIG. 6(b) shows schematically a 24×16 array of pixels 820 that may be used by the boundary processor 320 to construct an antialiased set corresponding to the binary set 740 of FIG. 6(a). In this example, r=3 and s=2. Each of the six pixels marked collectively as block 822 corresponds to the lower-right element 724 of the binary set 740. Because the dimensions of an antialiased set may be different from the dimensions of a binary set, coordinates (x,y) are used to refer to pixels within an antialiased set, and coordinates (i,j) are used to refer to elements within a binary set. The symbol $v_k(x,y)$ refers to a gray level value in antialiased set k with coordinates (x,y).

To determine gray level values for pixels in an antialiased set, the boundary processor 320 examines values in the corresponding binary set, applies an antialiasing operation to generate adjusted values for selected elements and maps any adjusted values to the corresponding pixels in the antialiased set. Because an antialiased set reflects the results of antialiasing, some of its pixels may have gray level values between 0 and 1. An antialiased set is not, in general, a binary image. A pixel in an antialiased set that does not receive a modified gray level value is assigned a gray level value equal to the value of the corresponding element in the corresponding binary set. This process is repeated for all pixels within all antialiased sets. FIG. 6(c) shows gray level values in an antialiased set 830 corresponding to the binary set 740 shown in FIG. 6(a). A plurality of pixels have undergone antialiasing and have adjusted gray level values. For example, each of the pixels in block 835 corresponds to element 726 in the binary set 740 of FIG. 6(a). Because element 726 is located on a boundary, its value is adjusted by the antialiasing operation and mapped to the antialiased set 830, producing various gray level values for the pixels in block 835.

The antialiasing process may be carried out by any one of a number of known antialiasing techniques. The preferred implementation uses a technique described in detail in U.S. patent application Ser. No. 10/047,326. According to this technique, the boundary processor 320 examines a binary set to identify a boundary element in the binary image, traces a group of elements in the neighborhood of, and including, the boundary element to construct a local boundary segment, and performs an antialiasing operation to parameterize and smooth the local boundary segment. The instructions for parameterizing and smoothing boundary segments are pre-computed, stored in a look-up table, and directly accessed during the antialiasing operation. The process of parameterizing and smoothing boundary segments "moves" some elements in the binary image from their original locations. Values of elements that are moved are mapped to the pixels within the corresponding antialiased set.

The process of parameterizing and smoothing boundaries in a binary image and mapping selected values to pixels within an antialiased set can be better understood by referring to FIGS. 7(a)-7(d). FIG. 7(a) shows a portion of a binary set, including a group of elements making up a local boundary segment 865. FIG. 7(b) is a schematic illustration of the boundary segment shown in FIG. 7(a) after parameterizing and smoothing. The element originally located in position 811 has been moved upward and to the left so that it now covers parts of elements 808, 809, 810 and 811. The element in position 813 has also been moved up and to the left. FIG. 7(c) illustrates schematically the antialiased values shown in FIG. 7(b) mapped to pixels in an antialiased set.

FIG. 7(c) is a schematic illustration of an array 882 for an antialiased set generated using parameters r=2 and s=2. Each element in the original boundary segment 865 corresponds to four pixels in the antialiased set shown in FIG. 7(c). The element originally located in position 811 covers portions of nine pixels including pixels 890-895 and influences the gray level values of these pixels. FIG. 7(d) shows schematically the final gray level values of pixels in the antialiased set.

Output Image Generator

An output image generator 350 combines the antialiased sets to produce an output image. The output image generator 350 creates an array of dimensions rM×sN. Because the output image has the same dimensions as the antialiased sets, coordinates in the output image are referred to as (x,y) and a gray level value in the output image is referred to as θ(x,y). The output image generator determines a gray level value θ(x,y) in the output image by summing the gray level values $v_k(x,y)$ from antialiased set 0 to antialiased set Q-1. This relation is set forth below:

$$\theta(x, y) = \sum_{n=0}^{Q-1} V_n(x, y)$$

In the preferred implementation, it is desirable to maintain the relation $v_k(i,j) \leq v_{k+1}(i,j)$ for all antialiased sets; however, the antialiasing process used to generate the antialiased sets may cause one or more gray level values within these sets to violate this condition. To maintain the relation expressed above, an adjustment may be made to the antialiased sets prior to generating the output image using a process similar to the following program fragment:

for each coordinate pair (i,j)
    for k=Q-2 down to 0
        $v_k(i,j)$=MIN($v_k(i,j)$, $V_{k+1}(i,j)$)

Reduction of Boundary Computations

In an alternative implementation, the boundary processor 320 reduces the computational requirements for the antialiasing operation by identifying boundaries in the input image instead of in the binary sets. This approach requires only one boundary identification operation instead of Q operations. To identify boundaries in the input image, any one of a number of known edge detectors such as a Sobel or Canny edge detector may be employed. The boundary processor 320 generates a single antialiased set, applies an antialiasing process to the boundary pixels in the input image and maps any modified gray level values to corresponding pixels in the antialiased set. Because boundaries are determined only once within the input image and not within each binary set, computation is greatly reduced. Binary sets are generated only to resolve ambiguities found by the boundary processor, as explained below.

In some cases, the boundary processor 320 may find multiple boundaries associated with a single pixel. For example, the boundary processor 320 may view a gray pixel as being located on two boundaries if it is bordered on one side by a white pixel and on another side by a black pixel. If a pixel with multiple boundaries is detected, the boundary processor 320 selects a group of pixels making up a local boundary region in the neighborhood of, and including, the pixel with multiple boundaries. The size and shape of the local boundary region are selected to satisfy the requirements of the antialiasing algorithm used. The boundary processor 320 generates Q "localized" binary sets based on the gray level values within the local boundary region, identifies boundaries within each localized binary set, and performs antialiasing with respect to boundaries within the localized binary sets. Values within localized binary sets 0 to Q-1, including values modified by antialiasing, are summed to produce gray level values for corresponding pixels in the antialiased set.

Gray level values within the antialiased set corresponding to unmodified pixels in the input image may be determined by performing a low-cost bilinear or pixel replication-based interpolation of the corresponding gray level values in the input image.

PWM Rendering

Figure 8:
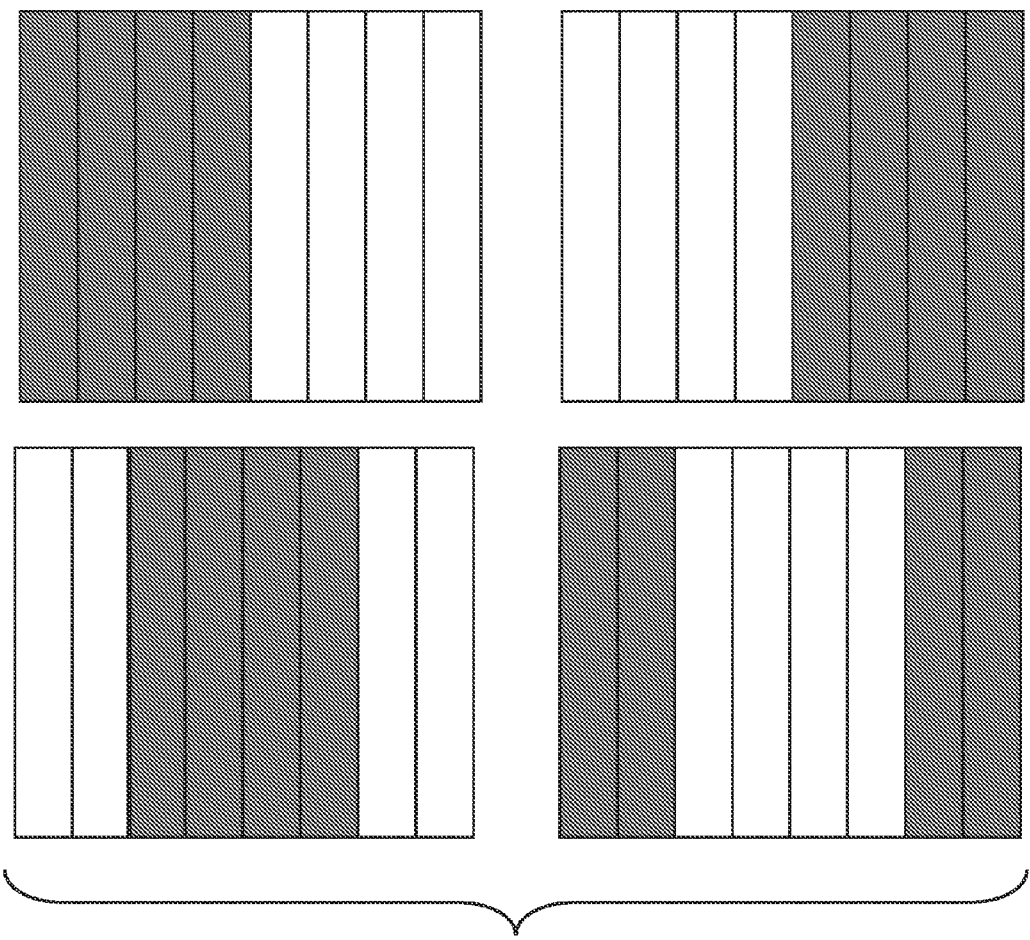
FIG. 8 shows several subpixel patterns that can be produced using pulse width modulation techniques.

Another aspect of the invention utilizes pulse-width modulation to render antialiased data while preserving boundary information present in the original image. Pulse-width modulation techniques generate subpixels that cover only a specified number of sub-elements within a pixel cell. FIG. 8 shows several subpixel patterns that can be produced using pulse width modulation techniques.

Figure 9:
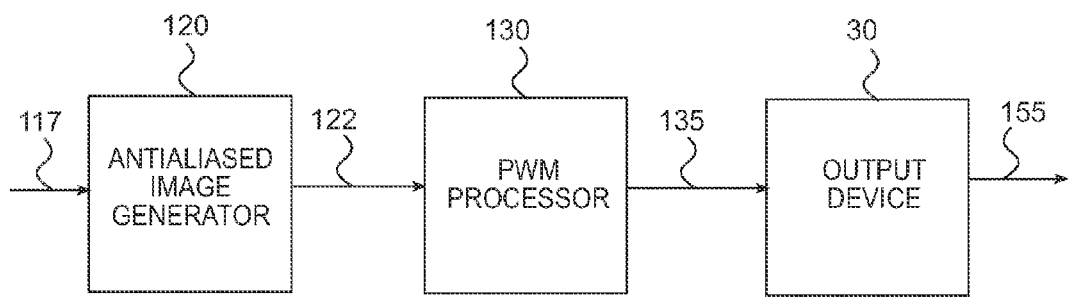
FIG. 9 is a block diagram of a system that may be used to carry out another aspect of the invention.

FIG. 9 is a block diagram of a system that may be used to carry out this aspect of the invention. An antialiased image generator 120 receives rasterized image data from path 117. The antialiased image generator 120 transmits antialiased image data along path 122 to a PWM processor 130. The PWM processor 130 receives antialiased image data from path 122 and transmits halftoned data along path 135 to an output device 30. The halftoned data generated by the PWM processor 130 includes data indicating the widths and positions of subpixels representing pixels in the image. The output device 30 may be any device capable of generating subpixels in an output image.

In a preferred implementation, the antialiased image generator 120 and the PWM processor 130 are incorporated within the controlling device 20. In other implementations, the antialiased image generator 120 and the PWM processor 130 are incorporated within an input device 10 or, alternatively, within an output device 30. In another alternative implementation, the antialiased image generator 120 is incorporated either within an input device 10 or within the controlling device 20, and the PWM processor 130 is incorporated into a separate output device 30.

The PWM processor 130 identifies a target pixel in the antialiased image and identifies one or more "donor" pixels in the original rasterized image that influence the gray level value of the target pixel. The PWM processor 130 determines for each donor pixel a weighting value indicating a degree to which it influences the gray level value of the target pixel. The weighting values are utilized to determine a position for a subpixel within the target pixel such that the subpixel is nearer to the donor pixel or pixels that have the greatest influence on the target pixel's gray level value.

The identification of donor pixels depends on the features of the antialiasing algorithm employed by the antialiased image generator 120. For example, in the preferred implementation, target pixels are identified in an antialiased set and donor pixels are identified within the corresponding binary set. The term "donor element" is used to refer to an element of a binary set that influences the gray level value of a pixel in an antialiased set. An element in a binary set that is moved by the antialiasing operation and overlaps the target pixel in an antialiased set is a donor element. An element in a binary set is also a donor pixel even though its value is not changed by antialiasing, if its value is mapped to the antialiased set in such a way that it influences the gray level value of the target pixel.

Figure 10:
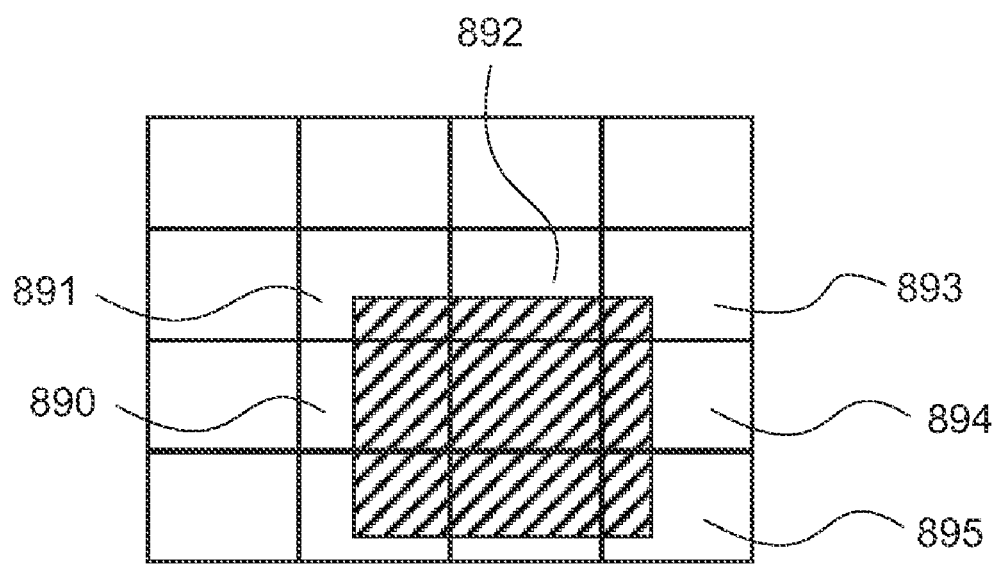
FIG. 10 is an expanded view of a portion of the antialiased set shown in FIG. 7(c).

The PWM processor 130 identifies for a given target pixel a set of donor pixels having gray level values ($D_1, D_2, \ldots, D_z$) and determines their "occupancy rates". An occupancy rate $\alpha$ represents a degree to which a donor pixel influences the gray level value of the target pixel. In the preferred implementation, this determination may be performed based on information generated by the boundary processor 320 during an antialiasing operation. In this implementation, an occupancy rate $\alpha$ represents the degree to which a donor element overlaps the pixel cell of the target pixel. If, for example, a donor element covers 65% of a target pixel, $\alpha=0.65$. The determination of occupancy rates can be better understood by referring to FIG. 10. FIG. 10 is an expanded view of a portion of the antialiased set shown in FIG. 7(c). As discussed above, the element originally located at position 811 in FIG. 7(b) was moved by the antialiasing operation and overlaps nine different pixels in the antialiased set, including pixels 890-895. Consequently, the gray level of pixel 890 is influenced by original elements 810 and 811 (shown in FIG. 7(b)). In this example, donor element 810 has $\alpha=0.35$ and donor element 811 has $\alpha=0.65$. For each target pixel within an antialiased set, the values $\alpha_n$ satisfy the relation:

$$\sum_{n=1}^{z} \alpha_n = 1.$$

The PWM processor 130 examines each donor pixel to determine whether it is located on the left side or the right side of the target pixel, taking into account any movement due to antialiasing, and computes a left contribution ("LC") value and a right contribution ("RC") value. In the preferred implementation, the occupancy rates are distributed into two sets, {$\alpha$left} and {$\alpha$right}. Depending on whether a donor pixel is located on the left side or the right side of the target pixel, its occupancy rate is assigned to {$\alpha$left} or to {$\alpha$right}, respectively. If a donor pixel overlaps portions of the left side and the right side of the target pixel, separate $\alpha$left and $\alpha$right values are computed to reflect the degree to which it overlaps each side of the target pixel, and the values are assigned to the respective sets. If the set of occupancy rates for the left side of the target pixel comprises values {$\alpha$left$_1$, ..., $\alpha$left$_m$} and the associated donor pixels have gray level values Dleft$_1$, ... Dleft$_m$, and the set of occupancy rates for the right side of the target pixel comprises values {$\alpha$right$_1$, ..., $\alpha$right$_n$}, and the associated donor pixels have gray level values Dright$_1$, ..., Dright$_n$, the values LC and RC are computed as follows:

$$LC = \sum_{i=1}^{m} \alpha left_i \cdot Dleft_i;$$

$$RC = \sum_{i=1}^{n} \alpha right_i \cdot Dright_i.$$

Although the preferred implementation computes LC and RC as a linear combination of the occupancy rates, it is possible to compute these values differently, for example, by giving greater weight to a donor pixel with a darker gray level.

The PWM processor 130 utilizes the left contribution value and the right contribution value to determine an optimal location for a subpixel within the target pixel that preserves boundary information present within the rasterized image. If L represents the length of a subpixel required to cover the entire target pixel, and the length of a pulse required to achieve a gray level $\theta(x,y)$ is $l(\theta(x,y))$, then an optimal offset position OFFSET measured from one side of the target pixel is determined as follows:

$$\text{OFFSET} = \left[ (L/2) - \left( \frac{LC}{LC + RC} \right) \cdot l(\theta(x, y)) \right]$$

If the above computation generates a negative value, then OFFSET=0.

In the preferred implementation, LC and RC are computed for the pixel with coordinates (x,y) in each antialiased set, and these values are summed over all antialiased sets to generate a total left contribution value ("TLC") and a total right contribution value ("TRC") for each pixel in the output image. The values TLC and TRC are used in the relation expressed above to determine a OFFSET value for a given pixel in the output image.

The OFFSET value is transmitted to the output device 30 and pulse width modulation is used to generate a subpixel within the target pixel cell. Due to design constraints of some output devices, it is often not possible to generate a subpixel at the precise location defined by OFFSET. In most cases, the closest approximation is rendered. For example, some printing devices restrict the number of allowable subpixel locations to two, the left edge or the right edge of a pixel cell. In such cases, the closest approximation of OFFSET may be achieved by rendering a subpixel at the left edge if LC>RC, at the right edge if RC>LC and at either edge if LC=RC.

The invention claimed is:

1. A method for processing rasterized image data made up of a plurality of input pixels, wherein each input pixel has a gray level value within a range of gray level values, and each input pixel is associated with a particular set of coordinates identifying the position of each input pixel in the image, the method comprising:
   (A) generating a plurality of binary arrays, each array having gray level label, and a plurality of elements, wherein each element in each binary array corresponds to a respective input pixel, each element has one of only two possible binary values, and is associated with a particular set of coordinates that identifies the position of an input pixel in the image;
   (B) determining the binary value of a particular element associated with a particular set of coordinates in a respective binary array by comparing a gray level value of a corresponding input pixel associated with the particular set of coordinates to the gray level label of the respective binary array;
      (i) setting the binary value of the particular element to a first value, among the two possible binary values, if the gray level label of the respective binary array is less than the gray level value of the corresponding input pixel associated with the particular set of coordinates; and
      (ii) setting the binary value of the particular element to a second value, among the two possible binary values, if the gray level label of the respective binary array is greater than the gray level value of the corresponding input pixel associated with the particular set of coordinates;
   (C) repeat step (B) for each element in the plurality of binary arrays;
   (D) applying an antialiasing operation to a particular binary array among the plurality of binary arrays to generate a particular set of antialiased values;
   (E) repeat step (D) for each binary array in the plurality of binary arrays forming a plurality of sets of antialiased values; and
   (F) combining individual antialiased values from all the plurality of sets antialiased values to determine a new gray level value of an output pixel in an output image.

2. The method of claim 1 wherein the plurality of sets of antialiased values are arranged in a plurality of antialiased arrays.

3. The method of claim 1 further comprising:
   determining an occupancy rate representing a degree to which the value of an input pixel in the rasterized image data influences a gray level value of an output pixel; and
   using the occupancy rate to determine a position of a subpixel representing the output pixel, wherein the subpixel is a dot in the output image generated using pulse width modulation.

4. The method of claim 1 wherein, the binary value of the element is set to the first value if the gray level label of the particular element is equal to the gray level of the corresponding input pixel associated with the particular set of coordinates.

5. The method of claim 1 wherein, an amount of elements in each binary array is equal to an amount of input pixels in the image.

6. An apparatus comprising a memory and processing circuitry coupled to the memory wherein the processing circuitry, which:
   (A) generates a plurality of binary arrays, each array having a gray level label, and a plurality of elements, wherein each element in each binary array correspond to a respective input pixel, each element has one of only two possible binary values, and is associated with a particular set of coordinates that identifies the position of an input pixel in an input image;
   (B) determines the binary value of a particular element associated with a particular set of coordinates in a respective binary array by comparing gray level value of a corresponding input pixel associated with the particular set of coordinates to the gray level label of the respective array;
      (i) sets the binary value of the particular element to a first value, among the two possible binary values, if the gray level label of the respective binary array is less than the gray level value of the corresponding input pixel associated with the particular set of coordinates; and
      (ii) sets the binary value of the particular element to a second value among the two possible binary values, if the gray level label of the respective binary array is greater than the gray level of the corresponding input pixel associated with the particular set of coordinates;
   (C) repeats step (B) for each element in the plurality of binary arrays;
   (D) applies an antialiasing operation to a particular binary array among the plurality of binary arrays to generate a particular set of antialiased value; and
   (E) repeats step (D) for each binary array in the plurality of binary arrays forming a plurality of sets of antialiased values; and
   (F) combines individual antialiased values from all the plurality of sets antialiased values to determine a new gray level value of an output pixel in an output image.

7. The apparatus of claim 6 wherein the plurality of sets of antialiased values are arranged in a plurality of antialiased arrays.

8. The apparatus of claim 6 wherein the processing circuitry is further adapted to:

determine an occupancy rate representing a degree to which the value of an input pixel in the rasterized image data influences a gray level value of an output pixel; and use the occupancy rate to determine a position of a subpixel representing the output pixel, wherein the subpixel is a dot in the output image generated using pulse width modulation.

9. A computer-readable medium encoded with a computer program embodying instructions for execution by a device to perform a method for processing rasterized image data made up of a plurality of input pixels, wherein each input pixel has a gray level value selected from a range of gray level values, and each input pixel is associated with a particular set of coordinates identifying the position of each input pixel in the image, wherein the method comprises:

(A) generating a plurality of binary arrays, each array having a gray level label, and a plurality of elements, wherein each element in each binary array corresponds to a respective input pixel, each element has one of only two possible binary values, and is associated with a particular set of coordinates that identifies the position of an input pixel in the image;

(B) determining the binary value of a particular element associated with a particular set of coordinates in a respective binary array by comparing the gray level value of a corresponding input pixel associated with the particular set of coordinates to the gray level label of the respective binary array;

(i) setting the binary value of the particular element to a first value, among the two possible binary values, if the gray level label of the respective binary array is less than the gray level value of the corresponding input pixel associated with the particular set of coordinates; and (ii) setting the binary value of the particular element to a second value, among the two possible binary values, if the gray level label of the respective binary array is greater than the gray level value of the corresponding input pixel associated with the particular set of coordinates;

(C) repeat step (B) for each element in the plurality of binary arrays;

(D) applying an antialiasing operation to a particular binary array among the plurality of binary arrays to generate a particular set of antialiased values (E) repeat step (D) for each binary array in the plurality of binary arrays forming a plurality of sets of antialiased values; and (F) combining individual antialiased values from all the plurality of sets antialiased values to determine a new gray level value of an output pixel in an output image.

10. The medium of claim 9 wherein the plurality of sets of antialiased values are arranged in a plurality of antialiased arrays.

11. The medium of claim 9 wherein the method further comprises:

determining an occupancy rate representing a degree to which the value of an input pixel in the rasterized image data influences a gray level value of an output pixel; and using the occupancy rate to determine a position of a subpixel representing the output pixel, wherein the subpixel is a dot in the output image generated using pulse width modulation.

* * * * *